United States Patent
Hu et al.

(10) Patent No.: US 10,862,569 B2
(45) Date of Patent: Dec. 8, 2020

(54) WIRELESS COMMUNICATION INTERFACE AND DRIVING METHOD THEREOF

(71) Applicant: Au Optronics Corporation, Hsinchu (TW)

(72) Inventors: Chia-Hua Hu, Hsinchu (TW); Chi-Hung Lu, Hsinchu (TW); Jen-Lang Tung, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/653,909

(22) Filed: Oct. 15, 2019

(65) Prior Publication Data

US 2020/0336197 A1    Oct. 22, 2020

(30) Foreign Application Priority Data

Apr. 22, 2019   (TW) ............................. 108114003 A

(51) Int. Cl.
*H04B 7/08*   (2006.01)
*H04B 1/06*   (2006.01)

(52) U.S. Cl.
CPC ............. *H04B 7/0834* (2013.01); *H04B 1/06* (2013.01)

(58) Field of Classification Search
None
See application file for complete search history.

(56) References Cited

U.S. PATENT DOCUMENTS

| | | | |
|---|---|---|---|
| 8,284,029 B2 | 10/2012 | Chou | |
| 8,626,242 B2 | 1/2014 | Ono | |
| 8,934,857 B2 | 1/2015 | Low et al. | |
| 9,337,666 B2 | 5/2016 | Low et al. | |
| 9,379,778 B2* | 6/2016 | Roh | ................... G06K 19/0726 |
| 9,935,691 B2 | 4/2018 | Konanur et al. | |
| 2010/0097188 A1 | 4/2010 | Chou | |
| 2011/0250839 A1* | 10/2011 | Lee | ..................... H04M 1/0202 455/41.1 |
| 2011/0281535 A1 | 11/2011 | Low et al. | |
| 2012/0003946 A1 | 1/2012 | Ono | |
| 2014/0248836 A1* | 9/2014 | Wakabayashi | ..... G06K 19/0716 455/41.1 |
| 2015/0115884 A1 | 4/2015 | Low et al. | |
| 2015/0180552 A1 | 6/2015 | Konanur et al. | |

(Continued)

FOREIGN PATENT DOCUMENTS

| | | | |
|---|---|---|---|
| CN | 102341958 | 2/2012 | |
| CN | 102449643 A * | 5/2012 | ....... G06K 19/07715 |

(Continued)

*Primary Examiner* — Lana N Le
(74) *Attorney, Agent, or Firm* — JCIPRNET

(57) ABSTRACT

A wireless communication interface and a driving method thereof are provided. The wireless communication interface includes a substrate, a plurality of active antennas, a plurality of passive antennas, and a sensing driving circuit. The active antennas are disposed on the substrate for receiving a radio frequency signal. The passive antennas are disposed on the substrate for resonating the RF signals of the adjacent active antennas in response to a control signal. The sensing driving circuit is coupled to the active antennas and the passive antennas for providing the radio frequency signal and the control signal.

12 Claims, 4 Drawing Sheets

(56) References Cited

U.S. PATENT DOCUMENTS

2015/0269477 A1* 9/2015 Finn .................. H01Q 1/38
                                                    235/492
2017/0124364 A1* 5/2017 Villar ............ G06K 7/10376
2018/0316379 A1* 11/2018 Chang ............... H04B 1/401

FOREIGN PATENT DOCUMENTS

| CN | 103296773 | 9/2013 | |
|----|-----------|--------|---|
| CN | 105103088 | 11/2015 | |
| CN | 104283330 | 4/2017 | |
| CN | 104732178 | 12/2017 | |
| TW | I378665 | 12/2012 | |
| WO | WO-2010137901 A2 * | 12/2010 | ....... G06K 19/07715 |

* cited by examiner

WIRELESS COMMUNICATION INTERFACE AND DRIVING METHOD THEREOF

CROSS-REFERENCE TO RELATED APPLICATION

This application claims the priority benefit of Taiwan application serial no. 108114003, filed on Apr. 22, 2019. The entirety of the above-mentioned patent application is hereby incorporated by reference herein and made a part of this specification.

BACKGROUND OF THE INVENTION

1. Field of the Invention

The invention relates to a communication interface, and particularly to a wireless communication interface and a driving method thereof.

2. Description of Related Art

With the popularity of the network, e-commerce has become a trend, and the use of electronic tickets such as credit cards or Easycard has become more common. In general, an electronic ticket receives power from a reader in a wireless manner, so that a circuit in the electronic ticket activated, and information required for transaction is finally transmitted back by the circuit. Therefore, the electronic ticket is usually placed in a fixed position. In order to make the use of the electronic ticket more flexible, the reader needs more antennas (or antenna matrices) for configuration corresponding to different positions. However, more antennas represent higher flexibility in the use of the electronic ticket, but require higher power consumption. Conversely, fewer antennas can reduce power consumption, but have less flexibility in the use of the electronic ticket.

SUMMARY OF THE INVENTION

The invention provides a wireless communication interface and a driving method thereof, which can maintain the flexibility in use of an electronic ticket, but reduce consumed power.

The wireless communication interface of the invention includes a substrate, a plurality of active antennas, a plurality of passive antennas and a sensing driving circuit. The active antennas are disposed on the substrate and configured to receive a radio frequency signal. The passive antennas are disposed on the substrate and configured to resonate the radio frequency signal of the adjacent active antennas in response to a control signal. The sensing driving circuit is coupled to the active antennas and the passive antennas and configured to provide the radio frequency signal and providing the control signal.

The driving method of the wireless communication interface of the invention includes the following steps. During a scan mode of the wireless communication interface, a radio frequency signal is sequentially received by a plurality of active antennas of the wireless communication interface to sequentially turn on active antennas in response to the radio frequency signal, and passive antennas which are adjacent to the active antennas and receive the radio frequency signal are turned on. Whether a sensed device is in proximity to the wireless communication interface is determined. When the sensed device is in proximity to the wireless communication interface, the wireless communication interface is switched to a transaction mode, and at least one of the active antennas is turned on.

Based on the above, in summary, in the wireless communication interface and the driving method thereof of the embodiments of the invention, the passive antennas couple the radio frequency signal of the active antennas to meet the requirement of sensing resolution. Thereby, an overall sensing effect can be achieved, and the required power consumption can be reduced.

In order to make the aforementioned and other objectives and advantages of the invention comprehensible, embodiments accompanied with figures are described in detail below.

DESCRIPTION OF THE EMBODIMENTS

Unless otherwise defined, all terms (including technical and scientific terms) used herein have the same meaning as commonly understood by one of ordinary skill in the art to which the invention belongs. It will be further understood that terms such as those defined in commonly used dictionaries should be interpreted as having a meaning that is consistent with their meaning in the context of the relevant art and the invention and will not be interpreted in an idealized or overly formal sense unless expressly so defined herein.

It should be understood that although terms such as "first", "second", and "third" in this specification may be used for describing various elements, components, areas, layers, and/or parts, the elements, components, areas, layers, and/or parts are not limited by such terms. The terms are only used to distinguish one element, component, area, layer, or part from another element, component, area, layer, or part. Therefore, the "first element", "component, "area", "layer", or "part" described below may also be referred to as a second element, component, area, layer, or part without departing from the teachings of the invention.

The terms used herein are merely used for describing particular embodiments rather than limiting the invention. As used in this specification, the articles "a", "an", and "the" are intended to include plural forms and include "at least one", unless the context clearly indicates otherwise. "Or" means "and/or". As used herein, the term "and/or" includes any and all combinations of one or more related items listed. It should also be understood that as used in this specification, the term "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 1A:
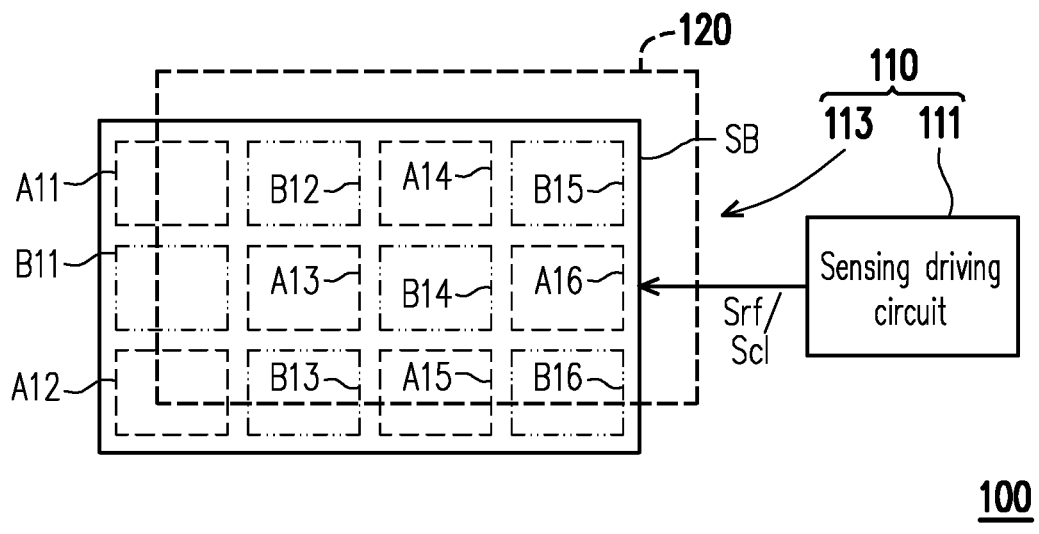
FIG. 1A is a schematic system diagram of an electronic device according to an embodiment of the invention.

FIG. 1A is a schematic system diagram of an electronic device according to an embodiment of the invention. In the present embodiment, an electronic device 100 may be an electronic vending machine or other devices, but the embodiments of the invention are not limited thereto. Referring to FIG. 1A, in the present embodiment, the electronic device 100 includes a wireless communication interface 110 and a display device 120. The display device 120 may be any one or any combination of display modules of any type, and the embodiments of the invention are not limited thereto.

The wireless communication interface 110 includes a sensing driving circuit 111 and a communication interface circuit 113. The communication interface circuit 113 includes a substrate SB, a plurality of active antennas A11-A16 and a plurality of passive antennas B11-B16, that is, a ratio of the number of the active antennas to the number of the passive antennas is 1:1. The sensing driving circuit 111 is coupled to the active antennas A11-A16 of the communication interface circuit 113 to provide a radio frequency signal Srf to a corresponding portion of (for example, one or more of) the active antennas A11-A16 and is coupled to the passive antennas B11-B16 of the communication interface circuit 113 to provide a control signal Scl to a corresponding portion of (for example, one or more of) the passive antennas B11-B16.

The active antennas A11-A16 are disposed on the substrate SB for receiving the radio frequency signal Srf and providing power in a wireless manner by using the radio frequency signal Srf. The passive antennas B11-B16 are disposed on the substrate SB for resonating the radio frequency signal Srf of the adjacent active antennas in response to the control signal Scl such that the wireless power may be extended. The passive antennas B11-B16 may implement the signal resonance by using a magnetic resonance coupling (MRC) technology, but the embodiments of the invention are not limited thereto.

In the present embodiment, with respect to a surface that the substrate SB is disposed, the active antennas A11-A16 and the passive antennas B11-B16 are arranged in an array. In other words, on the substrate SB, the active antennas A11-A16 are respectively disposed adjacent to the corresponding portions of the passive antennas B11-B16, but the active antennas A11-A16 are not adjacent to each other, and the passive antennas B11-B16 are not adjacent to each other.

In a circuit operation, the electronic device 100 may be first operated in a scan mode transaction information (such as an item or commodity for sale) may be disposed on the display device 120, and the wireless communication interface 110 scans to determine whether a sensed device is in proximity to the wireless communication interface 110 and determine a position to which the sensed device is in proximity.

In the scan mode, the active antennas A11-A16 sequentially receive the radio frequency signal Srf and are sequentially turned on in response to the radio frequency signal Srf, and the passive antennas (e.g., B11-B16) which are adjacent to the active antennas and receive the radio frequency signal Srf are turned on. For example, when the active antenna A11 receives the radio frequency signal Srf, the passive antennas B11 and B12 may be turned on. When the active antenna A12 receives the radio frequency signal Srf, the passive antennas B11 and B13 may be turned on. The same manner is adopted for the rest and will not be repeated herein. The above-mentioned "sequentially" turned on may not be turned on "one by one", but may be turned on two by two or alternated with each other in time. For example, the active antennas A11 and A13 may be turned on firstly, and then the active antennas A12 and A13 are turned on. The same manner is adopted for the rest and may be determined according to the transaction information/items displayed on the display device 120, but the embodiments of the invention are not limited thereto.

After confirming the position to which the sensed device is in proximity, the wireless communication interface 110 (i.e., the sensing driving circuit 111) may identify a user's transaction action (i.e., the item or commodity to be purchased) through the position to which the sensed device is in proximity. That is, the user's transaction action may be determined according to the position of the active antenna receiving the radio frequency signal Srf. Next, the wireless communication interface 110 may provide a signal indicating the transaction action to an external processing circuit and receive a signal confirming a transaction from the external processing circuit. Alternatively, the wireless communication interface 110 (i.e., the sensing driving circuit 111) may directly perform a transaction confirmation action after identifying the transaction action.

At this time, the electronic device 100 may operate in a transaction mode, and the display device 120 may display a text or symbol that confirms the transaction. Correspondingly, the active antennas (e.g., A11-A16) and/or the passive antennas (e.g., B11-B16) corresponding to the position of the text or symbol that confirms the transaction may be turned on to sense whether the sensed device is in proximity to the text or symbol that confirms the transaction, thereby confirming whether the transaction proceeds.

For example, when the text or symbol that confirms the transaction corresponds to one of the active antennas (e.g., A11-A16), only the radio frequency signal Srf may be provided to the corresponding active antennas (e.g., A11-A16) to turn on the corresponding active antennas (e.g., A11-A16) and turn off the other active antennas (e.g., A11-A16) and all the passive antennas (e.g., B11-B16). When the text or symbol that confirms the transaction corresponds to one of the passive antennas (e.g., B11-B16), only the corresponding passive antennas (e.g., B11-B16) may be turned on, the other passive antennas (e.g., B11-B16) may be turned off, the radio frequency signal Srf may be provided to at least one of the active antennas (e.g., A11-A16) adjacent to the corresponding passive antennas (e.g., B11-B16) to turn on the adjacent active antennas (e.g., A11-A16), and the other active antennas (e.g., A11-A16) may also be turned off.

Then, when the electronic device 100 senses that the sensed device is in proximity to the text or symbol that confirms the transaction or the electronic device 100 operates in the transaction mode for a preset time, the electronic device 100 is switched to the scan mode to wait for a next transaction action of the user. Thereby, the passive antennas couple the radio frequency signal of the active antennas, so that an overall sensing effect may be achieved, and the required power consumption may be reduced.

In the embodiments of the invention, the communication interface circuit 113 may communicate with the sensed device through a wireless communication manner such as near-field communication (NFC), and the sensed device may be an electronic device with an antenna, such as a mobile device or a smart card, but the embodiments of the invention are not limited thereto.

Figure 1B:
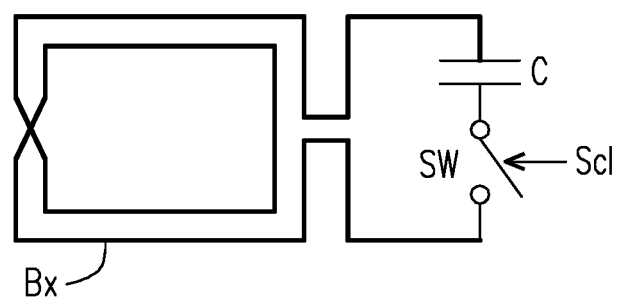
FIG. 1B is a schematic circuit diagram of a passive antenna coupled to a switch and a capacitor according to an embodiment of the invention.

FIG. 1B is a schematic circuit diagram of a passive antenna coupled to a switch and a capacitor according to an embodiment of the invention. Referring to FIG. 1A and FIG. 1B, in the present embodiment, each passive antenna Bx (e.g., B11-B16) is connected in series with a scan switch SW and a resonant capacitor C. The scan switch SW receives a control signal Scl and is turned off or on in response to the control signal Scl. When the scan switch SW is turned on in response to the control signal Scl, the passive antenna Bx is turned on. When the scan switch SW is turned off in response to the control signal Scl, the passive antenna Bx is turned off.

Figure 2:
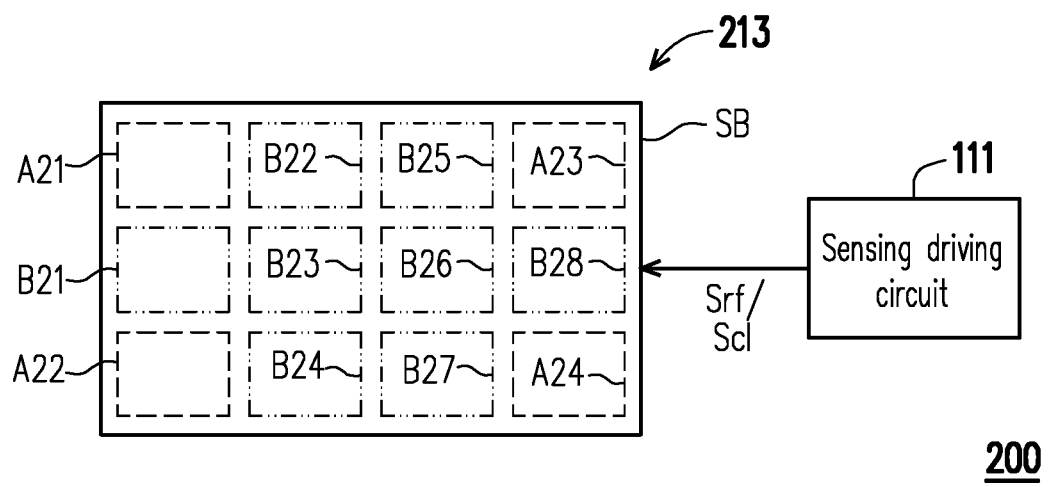
FIG. 2 is a schematic system diagram of a wireless communication interface according to an embodiment of the invention.

FIG. 2 is a schematic system diagram of a wireless communication interface according to an embodiment of the invention. Referring to FIG. 1A and FIG. 2, a wireless communication interface 200 is substantially the same as the wireless communication interface 110, different therefrom in a communication interface circuit 213. The same or similar elements use the same or similar reference numerals. In the present embodiment, the communication interface circuit 213 includes a substrate SB, a plurality of active antennas A21-A24 and a plurality of passive antennas B21-B28, that is, a ratio of the number of the active antennas to the number of the passive antennas is 1:2. Furthermore, in the present embodiment, with respect to a surface that the substrate SB is disposed, the active antennas A21-A24 and the passive antennas B21-B28 are still arranged in an array, but the active antennas A21-A24 are mainly disposed at corner portions of the substrate SB, and the passive antennas B21-B28 are disposed in other regions.

Figure 3:
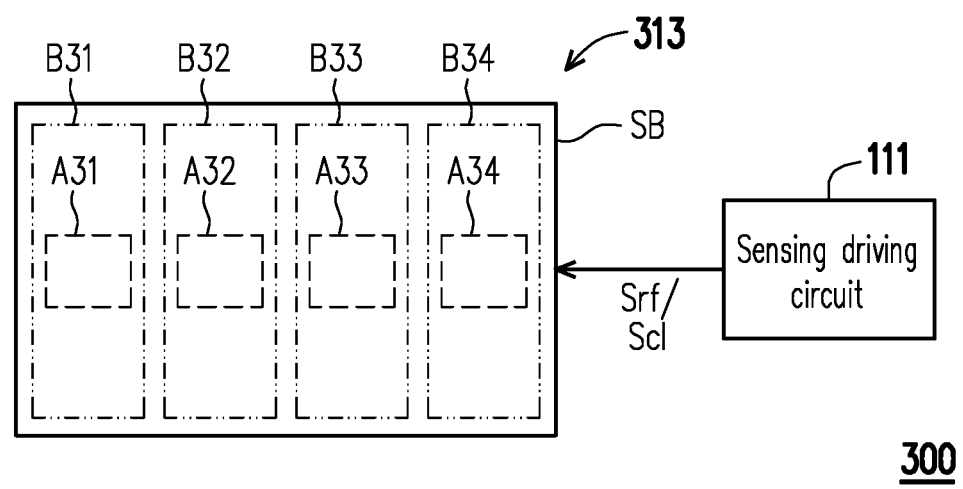
FIG. 3 is a schematic system diagram of a wireless communication interface according to an embodiment of the invention.

FIG. 3 is a schematic system diagram of a wireless communication interface according to an embodiment of the invention. Referring to FIG. 1A and FIG. 3, a wireless communication interface 300 is substantially the same as the wireless communication interface 110, but different therefrom in a communication interface circuit 313. The same or similar elements use the same or similar reference numerals. In the present embodiment, the communication interface circuit 313 includes a substrate SB, a plurality of active antennas A31-A34 and a plurality of passive antennas B31-B34, that is, a ratio of the number of the active antennas to the number of the passive antennas is 1:1.

Furthermore, in the present embodiment, with respect to a surface that the substrate SB is disposed, the passive antennas B31-B34 are, for example, disposed one by one along a direction from the left side to the right side of the substrate SB, and one of the active antennas A31-A34 is disposed in each of the passive antennas B31-B34. For example, the active antenna A31 is disposed in the passive antenna B31, the active antenna A32 is disposed in the passive antenna B32, and the same manner is adopted for the rest.

In the above embodiment, the passive antennas are disposed along a specific direction, and the active antenna is disposed in the passive antenna. However, in other embodiments, the passive antennas may be arranged in an array, and at least one active antenna may be disposed in each of the passive antennas, depending on the needs of the circuit design, but the embodiments of the invention are not limited thereto.

Figure 4:
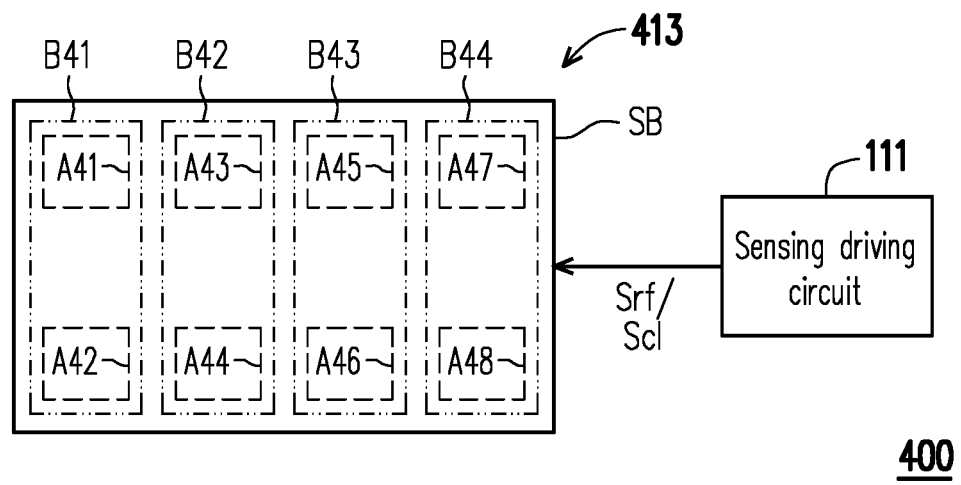
FIG. 4 is a schematic system diagram of a wireless communication interface according to an embodiment of the invention.

FIG. 4 is a schematic system diagram of a wireless communication interface according to an embodiment of the invention. Referring to FIG. 1A and FIG. 4, a wireless communication interface 400 is substantially the same as the wireless communication interface 110, but different therefrom in a communication interface circuit 413. The same or similar elements use the same or similar reference numerals. In the present embodiment, the communication interface circuit 413 includes a substrate SB, a plurality of active antennas A41-A48 and a plurality of passive antennas B41-B44, that is, a ratio of the number of the active antennas to the number of the passive antennas is 2:1.

Furthermore, in the present embodiment, with respect to a surface that the substrate is disposed, the passive antennas B41-B44 are, for example, disposed one by one along a direction from the left side to the right side of the substrate SB, and two of the active antennas A41-A48 are disposed in each of the passive antennas B41-B44. For example, the active antennas A41 and A42 are disposed in the passive antenna B41, the active antennas A43 and A44 are disposed in the passive antenna B42, and the same manner is adopted for the rest.

In the above embodiment, two active antennas are disposed in each of the passive antennas. However, in other embodiments, more than two active antennas may be disposed in each of the passive antennas, and different numbers of active antennas may be disposed in each of the passive antennas, depending on the needs of the circuit design. The embodiments of the invention are not limited thereto.

Figure 5:
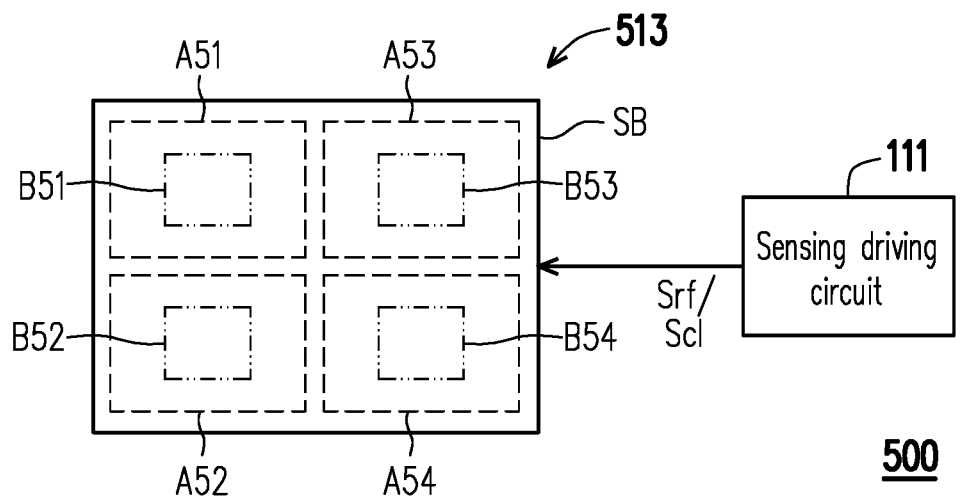
FIG. 5 is a schematic system diagram of a wireless communication interface according to an embodiment of the invention.

FIG. 5 is a schematic system diagram of a wireless communication interface according to an embodiment of the invention. Referring to FIG. 1A and FIG. 5, a wireless communication interface 500 is substantially the same as the wireless communication interface 110, but different therefrom in a communication interface circuit 513. The same or similar elements use the same or similar reference numerals. In the present embodiment, the communication interface circuit 513 includes a substrate SB, a plurality of active antennas A51-A54 and a plurality of passive antennas B51-B54, that is, a ratio of the number of the active antennas to the number of the passive antennas is 1:1.

Furthermore, in the present embodiment, with respect to a surface that the substrate is disposed, the active antennas A51-A54 are arranged in an array, and one of the passive antennas B51-B54 is disposed in each of the active antennas A51-A54. For example, the passive antenna B51 is disposed in the active antenna A51, the passive antenna B52 is disposed in the active antenna A52, and the same manner is adopted for the rest.

In the above embodiment, one passive antenna is disposed in each of the passive antennas. However, in other embodiments, more than one passive antenna may be disposed in each of the active antennas, and different numbers of passive antennas may be disposed in each of the active antennas, depending on the needs of the circuit design. The embodiments of the invention are not limited thereto.

Moreover, in the above embodiment, the active antennas are arranged in an array, and the passive antenna is disposed in the active antenna. However, in other embodiments, the active antennas may be disposed along a specific direction (for example, from left to right), and at least one passive antenna may be disposed in each of the active antennas, depending on the needs of the circuit design. The embodiments of the invention are not limited thereto.

Figure 6:
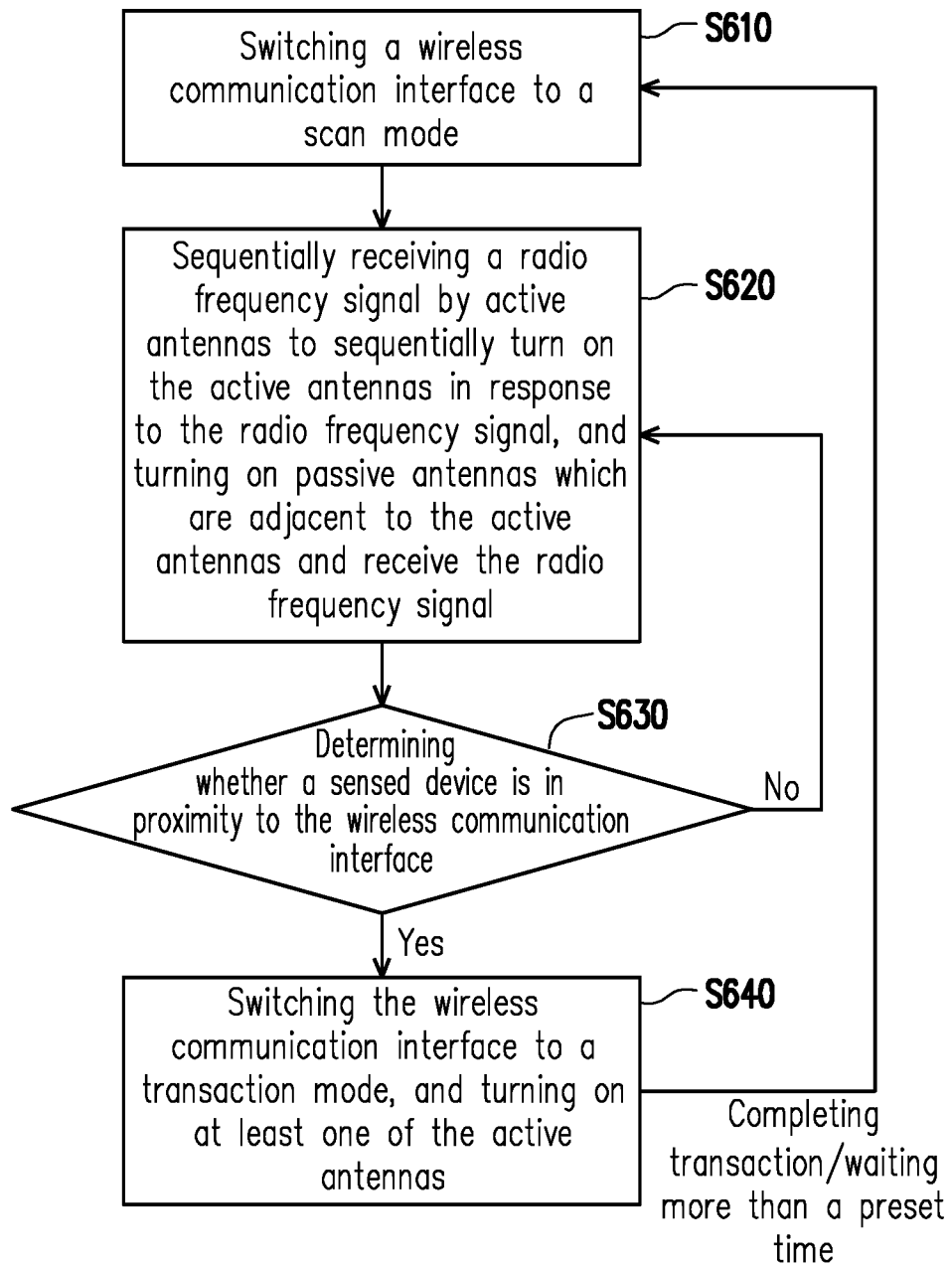
FIG. 6 is a flow chart of a driving method of a wireless communication interface according to an embodiment of the invention.

FIG. 6 is a flow chart of a driving method of a wireless communication interface according to an embodiment of the invention. Referring to FIG. 6, in the present embodiment, the driving method of the wireless communication interface includes the following steps. In step S610, the wireless communication interface is switched to a scan mode. In step S620, during the scan mode of the wireless communication interface, active antennas sequentially receive a radio frequency signal and are sequentially turned on in response to the radio frequency signal, and passive antennas which are adjacent to the active antennas and receive the radio frequency signal are turned on. In step S640, whether a sensed device is in proximity to the wireless communication interface is determined. When the sensed device is not in proximity to the wireless communication interface, that is, the determination result of step S630 is "No", the flow returns to step S620. When the sensed device is in proximity to the wireless communication interface, that is, the determination result in step S630 is "Yes", perform step S640 is performed. In step S630, the wireless communication interface is switched to a transaction mode, and at least one of the active antennas is turned on to confirm whether the transaction is completed. When the transaction is completed or the time that the wireless communication interface waits for is more than preset time, the flow returns to step S610 to return to the scan mode. The sequence of steps S610, S620, S630 and S640 is used for the description, and the embodiments of the invention are not limited thereto. Moreover, for details related to steps S610, S620, S630 and S640, reference may be made to the embodiments of FIG. 1A, FIG. 1B and FIG. 2 to FIG. 5, which are not repeated herein.

Based on the above, according to the wireless communication interface and the driving method thereof of the embodiments of the invention, the passive antennas couple the radio frequency signal of the active antennas. Thereby, the effect of overall sensing can be achieved, and the required power consumption can be reduced.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A wireless communication interface, comprising:
    a substrate;
    a plurality of active antennas, disposed on the substrate and configured to receive a radio frequency signal;
    a plurality of passive antennas, disposed on the substrate and configured to resonate the radio frequency signal of the adjacent active antennas in response to a control signal; and
    a sensing driving circuit, coupled to the active antennas and the passive antennas and configured to provide the radio frequency signal and provide the control signal.

2. The wireless communication interface according to claim 1, wherein when the wireless communication interface is in a scan mode, the active antennas sequentially receive the radio frequency signal and are sequentially turned on in response to the radio frequency signal, and the passive antennas which are adjacent to the active antennas and receive the radio frequency signal are turned on.

3. The wireless communication interface according to claim 1, wherein when the wireless communication interface is in a transaction mode, one of the active antennas receives the radio frequency signal and is turned on in response to the radio frequency signal, and the rest of the active antennas and the passive antennas are turned off.

4. The wireless communication interface according to claim 1, wherein when the wireless sensing interface is in a transaction mode, one of the passive antennas is turned on in response to the control signal, the active antenna which is adjacent to the turned-on passive antenna and receives the radio frequency signal and is turned on in response to the radio frequency signal, and the rest of the active antennas and the rest of the passive antennas are turned off.

5. The wireless communication interface according to claim 1, wherein each of the passive antennas is connected in series with a scan switch and a resonant capacitor, wherein the scan switch receives the control signal and is turned off or on in response to the control signal.

6. The wireless communication interface according to claim 1, wherein with respect to a surface that the substrate is disposed, the active antennas and the passive antennas are arranged in an array.

7. The wireless communication interface according to claim 1, wherein with respect to a surface that the substrate is disposed, at least one of the passive antennas is disposed in each of the active antennas.

8. The wireless communication interface according to claim 1, wherein with respect to a surface that the substrate is disposed, at least one of the active antennas is disposed in each of the passive antennas.

9. A driving method of a wireless communication interface, comprising:
    during a scan mode of the wireless communication interface, sequentially receiving a radio frequency signal by a plurality of active antennas of the wireless communication interface to sequentially turn on the active antennas in response to the radio frequency signal, and turning on passive antennas adjacent to the active antennas receiving the radio frequency signal;
    determining whether a sensed device is in proximity to the wireless communication interface; and
    when the sensed device is in proximity to the wireless communication interface, switching the wireless communication interface to a transaction mode and turning on at least one of the active antennas.

10. The driving method of the wireless communication interface according to claim 9, further comprising:
    when the wireless communication interface is in the transaction mode, receiving the radio frequency signal by one of the active antennas to turn on the one of the active antennas in response to the radio frequency signal, and turning off the rest of the active antennas and the passive antennas.

11. The driving method of the wireless communication interface according to claim 9, further comprising:
    when the wireless sensing interface is in the transaction mode, turning on one of the passive antennas in response to the control signal, receiving the radio frequency signal by the active antenna adjacent to the turned-on passive antenna to turn on the active antenna in response to the radio frequency signal, and turning off the rest of the active antennas and the rest of the passive antennas.

12. The driving method of the wireless communication interface according to claim 9, further comprising:
    when the sensed device is in proximity to the wireless communication interface, determining a transaction action of a user according to the position of the active antenna receiving the radio frequency signal.

* * * * *